(12) United States Patent
Chen et al.

(10) Patent No.: US 12,321,541 B2
(45) Date of Patent: Jun. 3, 2025

(54) TOUCH PAD DEVICE

(71) Applicant: SUNREX TECHNOLOGY CORP., Taichung (TW)

(72) Inventors: Chun-Chieh Chen, Taichung (TW); Yi-Wen Tsai, Taichung (TW)

(73) Assignee: SUNREX TECHNOLOGY CORP., Taichung (TW)

( * ) Notice: Subject to any disclaimer, the term of this patent is extended or adjusted under 35 U.S.C. 154(b) by 0 days.

(21) Appl. No.: 18/756,190

(22) Filed: Jun. 27, 2024

(65) Prior Publication Data
US 2025/0077001 A1 Mar. 6, 2025

(30) Foreign Application Priority Data

Sep. 1, 2023 (TW) ................................. 112209418
Mar. 20, 2024 (TW) ................................. 113202798

(51) Int. Cl.
*G06F 3/033* (2013.01)
*G06F 3/0354* (2013.01)

(52) U.S. Cl.
CPC ................................ *G06F 3/03547* (2013.01)

(58) Field of Classification Search
CPC .... G06F 1/169; G06F 3/0354; G06F 3/03547; G06F 3/041; G06F 3/0414
See application file for complete search history.

(56) References Cited

U.S. PATENT DOCUMENTS

| 11,340,719 | B1 * | 5/2022 | Lin | G06F 3/03547 |
| 12,242,677 | B1 * | 3/2025 | Chen | G06F 3/03547 |
| 2012/0103773 | A1 * | 5/2012 | Villain | G06F 3/03547 |
| | | | | 200/344 |
| 2015/0243457 | A1 * | 8/2015 | Niu | H01H 13/46 |
| | | | | 156/247 |
| 2019/0243475 | A1 * | 8/2019 | Huang | G06F 1/1681 |
| 2019/0391656 | A1 * | 12/2019 | Togawa | G06F 3/042 |
| 2021/0263556 | A1 * | 8/2021 | Degner | G06F 3/04883 |
| 2022/0066580 | A1 * | 3/2022 | Lin | G06F 3/03547 |

FOREIGN PATENT DOCUMENTS

TW M631146 U * 8/2022

* cited by examiner

*Primary Examiner* — Joe H Cheng
(74) *Attorney, Agent, or Firm* — Muncy, Geissler, Olds & Lowe, P.C.

(57) ABSTRACT

A touch pad device includes a base unit, a touch unit and a resilient unit. The base unit includes a bottom plate and a supporting member disposed on the bottom plate. The touch unit includes a touch pad, a circuit board connected to the touch pad, and a switch button disposed the circuit board. The switch button corresponds in position to the supporting member. The resilient unit is disposed between the bottom plate and the circuit board, and includes a resilient plate connected to the bottom plate, and a reinforcing frame connected between the resilient plate and the circuit board. The resilient plate has two resilient piece portions, and an abutment portion connected to the resilient piece portions and supported by the supporting member. The abutment portion is positioned between the switch button and the supporting member. The reinforcing frame is connected to the resilient piece portions.

9 Claims, 15 Drawing Sheets

TOUCH PAD DEVICE

CROSS-REFERENCE TO RELATED APPLICATION

This application claims priority to Taiwanese Utility Model Patent Application No. 112209418 and Taiwanese Utility Model Patent Application No. 113202798, respectively filed on Sep. 1, 2023 and Mar. 20, 2024, the entire disclosures of which are incorporated by reference herein.

FIELD

The disclosure relates to an electronic input device, and more particularly to a touch pad device.

BACKGROUND

A conventional laptop usually includes a touch pad (as known as a track pad) that serves as an alternative to a mouse.

A conventional touch pad device as disclosed in Taiwanese Utility Model Patent Certificate No. M631146 includes a base unit, a linkage unit, and a touch unit. The base unit includes a base body, a fixed portion disposed on the base body, and four hook holes respectively formed in four corners of the base body. The linkage unit includes an elastic plate, two shims connected to the elastic plate, and four hook members connected to the elastic plate and respectively hooked to the hook holes. The elastic plate includes an abutment member corresponding in position to the fixed portion. The touch unit includes a circuit board, a push-button switch connected to a bottom of the circuit board, and a cover plate connected to a top of the circuit board. When the cover plate of the touch unit is being pressed, at least one of the hook members serves as the fulcrum, and the elastic plate, the circuit board and the cover plate are inclined relative to the base body, so the abutment member of the elastic plate is pushed by the fixed portion to abut thereagainst, and then the push-button switch is triggered by being pushed by the abutment member.

When the touch unit is being pressed, displacement of a periphery of the elastic plate is limited along an up-down direction. However, since the connecting structure between the touch unit and the linkage unit only relies on the circuit board and the shims, when the touch unit is being pressed, the limiting effect of the periphery of the elastic plate is unstable and the structural strength thereof is relatively weak.

In addition, when an overall size of the touch pad device becomes larger, thicknesses of the components of the touch pad device, spaces therebetween and an area of the touch pad device may become greater, so when the touch unit is being pressed, the resistance arm between the resistance and the fulcrum becomes longer, and there is an increase in the displacement of triggering the push-button switch. Thus, a larger force must be applied by a user to trigger the push-button switch, which causes inconvenience in use.

SUMMARY

Therefore, an object of the disclosure is to provide a touch pad device that can alleviate at least one of the drawbacks of the prior art.

According to the disclosure, the touch pad device includes a base unit, a touch unit and a resilient unit. The base unit includes a bottom plate and a supporting member disposed on the bottom plate. The touch unit includes a touch pad, a circuit board connected to a bottom of the touch pad, and a switch button disposed on a bottom of the circuit board. The switch button corresponds in position to the supporting member. The resilient unit is disposed between the bottom plate and the circuit board, and includes a resilient plate connected to the bottom plate, and a reinforcing frame connected between the resilient plate and the circuit board. The resilient plate has two resilient piece portions, and an abutment portion connected to the resilient piece portions and supported by and abutting against the supporting member. The abutment portion is positioned between the switch button and the supporting member. The reinforcing frame is connected to the resilient piece portions.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 1:
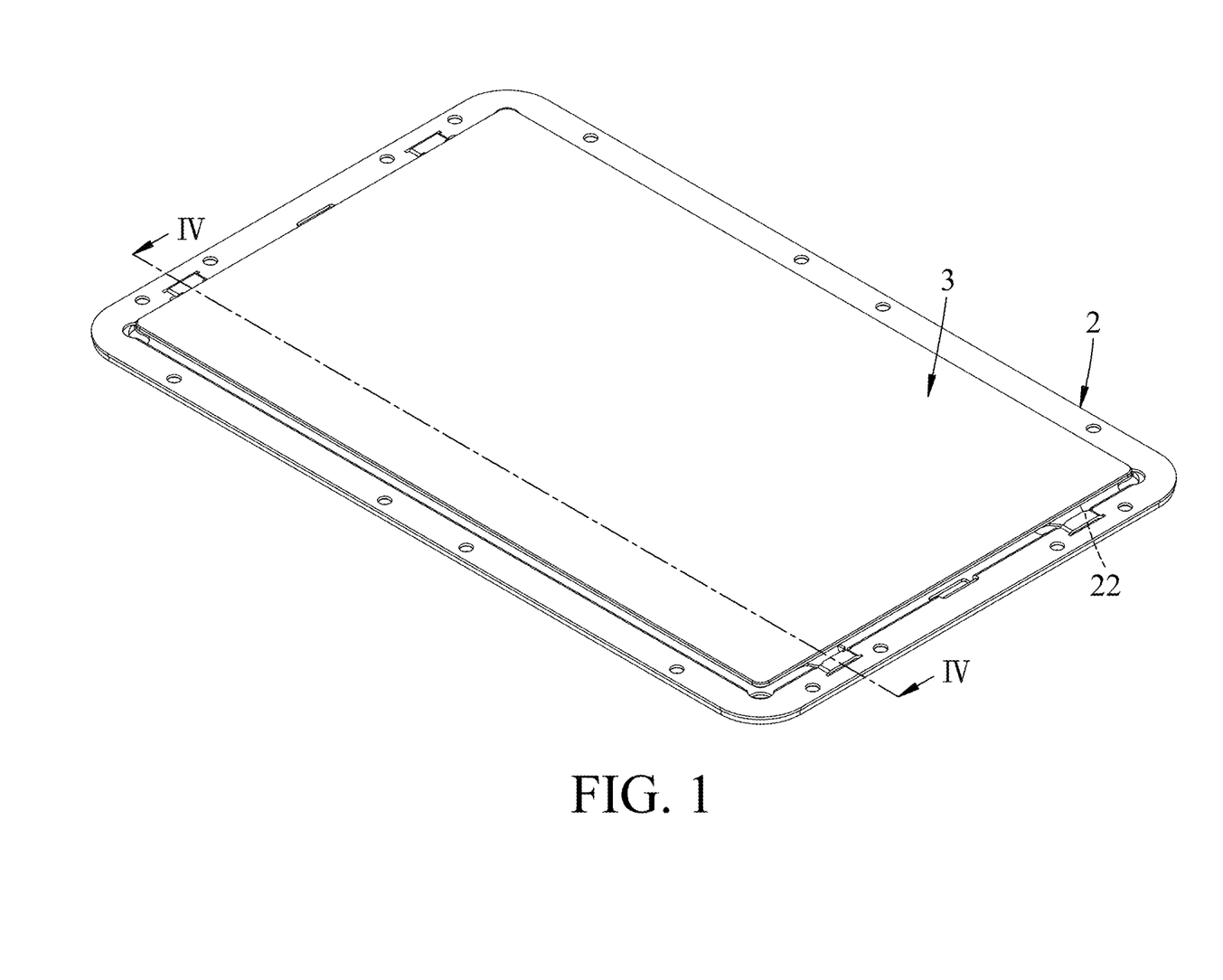
FIG. 1 is a perspective view of a first embodiment of a touch pad device according to the present disclosure.
Figure 2:
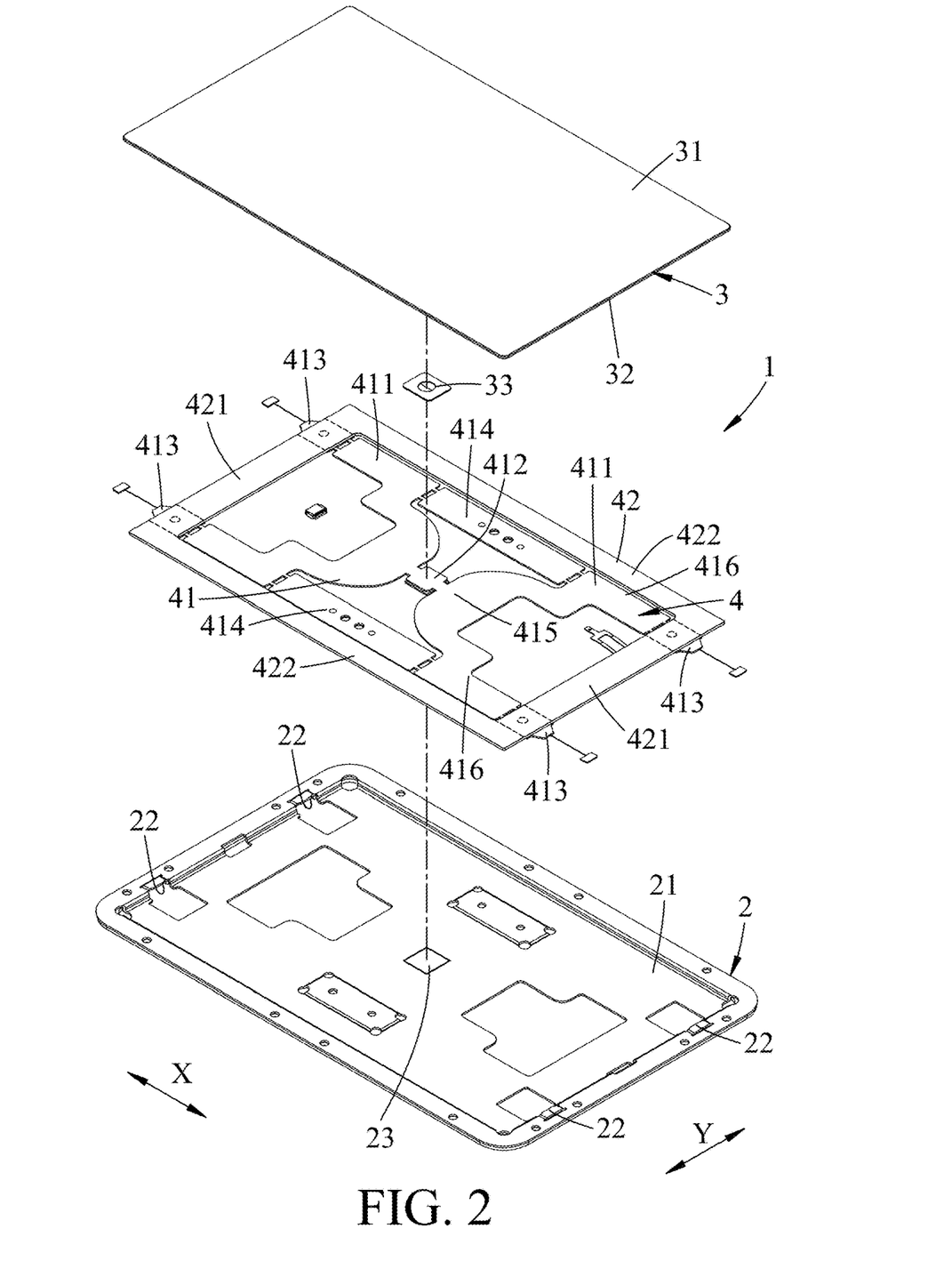
FIG. 2 is an exploded perspective view of the first embodiment.
Figure 3:
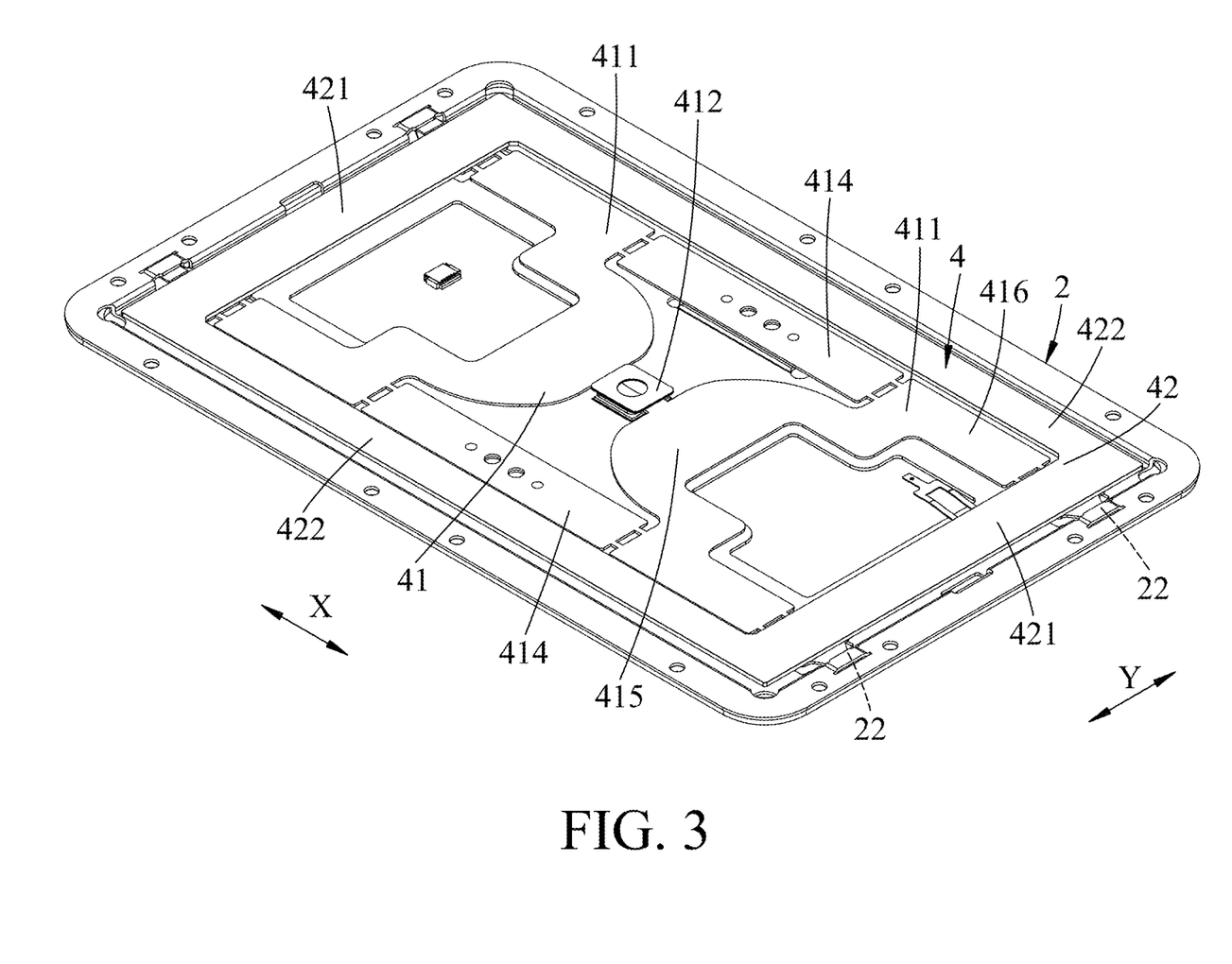
FIG. 3 is a fragmentary perspective view of the first embodiment without a touch unit.

Referring to FIGS. 1 to 3, a first embodiment of a touch pad device 1 according to the present disclosure is adapted to be mounted to a bottom of a keyboard housing of a laptop (not shown), and includes a base unit 2, a touch unit 3, and a resilient unit 4.

The base unit 2 is disposed on the bottom of the keyboard housing, and includes a bottom plate 21, a plurality of hook holes 22 that are formed on four corners of the bottom plate 21 and that are spaced apart from each other, and a supporting member 23 that is disposed at a center of the bottom plate 21. In this embodiment, a number of the plurality of hook holes 22 is four.

The touch unit 3 includes a touch pad 31, a circuit board 32 that is connected to a bottom of the touch pad 31, and a switch button 33 that is disposed on a bottom of the circuit board 32 and that corresponds in position to the supporting member 23.

The resilient unit 4 is disposed between the bottom plate 21 and the circuit board 32, and includes a resilient plate 41 that is connected to the bottom plate 21, and a reinforcing frame 42 that is connected between the resilient plate 41 and the circuit board 32.

Referring to FIGS. 2 and 3, the resilient plate 41 has two resilient piece portions 411 that are spaced apart in a left-right direction (X), an abutment portion 412 that is connected to the resilient piece portions 411, that is supported by and abuts against the supporting member 23 and that is positioned between the switch button 33 and the supporting member 23, a plurality of hook portions 413 (in this embodiment, there are four hook portions 413) that are connected to the resilient piece portions 411 and that are respectively hooked to the hook holes 22, and two reinforcing piece portions 414 that are connected to the resilient piece portions 411. Each of the resilient piece portions 411 is substantially U-shaped, and has a connecting section 415 that is connected to the abutment portion 412, and two extension sections 416 that extend from the connecting section 415 respectively towards a direction away from the abutment portion 412 (i.e., the left-right direction (X) in this embodiment). The extension sections 416 of each of the resilient piece portions 411 are spaced apart from each other in a direction perpendicular to the left-right direction (X) (i.e., a front-rear direction (Y)), and are respectively connected to two of the hook portions 413. Each of the reinforcing piece portions 414 is positioned between the resilient piece portions 411, and is connected between two adjacent extension sections 416 of the resilient piece portions 411 in the left-right direction (X). The reinforcing piece portions 414 are fixed to the bottom plate 21.

The reinforcing frame 42 is in a shape of a closed frame, and is connected to the resilient piece portions 411. The reinforcing frame 42 has two first frame segments 421, and two second frame segments 422 which are connected between the first frame segments 421, which are spaced apart from each other in the front-rear direction (Y) and each of which is correspondingly adjacent to two of the extension sections 416 of the resilient piece portions 411. The reinforcing frame 42 is connected to the hook portions 413; in specific, each of the first frame segments 421 is correspondingly connected to two of the hook portions 413, and the second frame segments 422 are positioned outside the reinforcing piece portions 414 respectively and are positioned outside the resilient piece portions 411. In the first embodiment, the first frame segments 421 are connected to the corresponding hook portions 413 by spot welding. The first and second frame segments 421, 422 are connected to the circuit board 32 by adhesive attachment.

Figure 4:
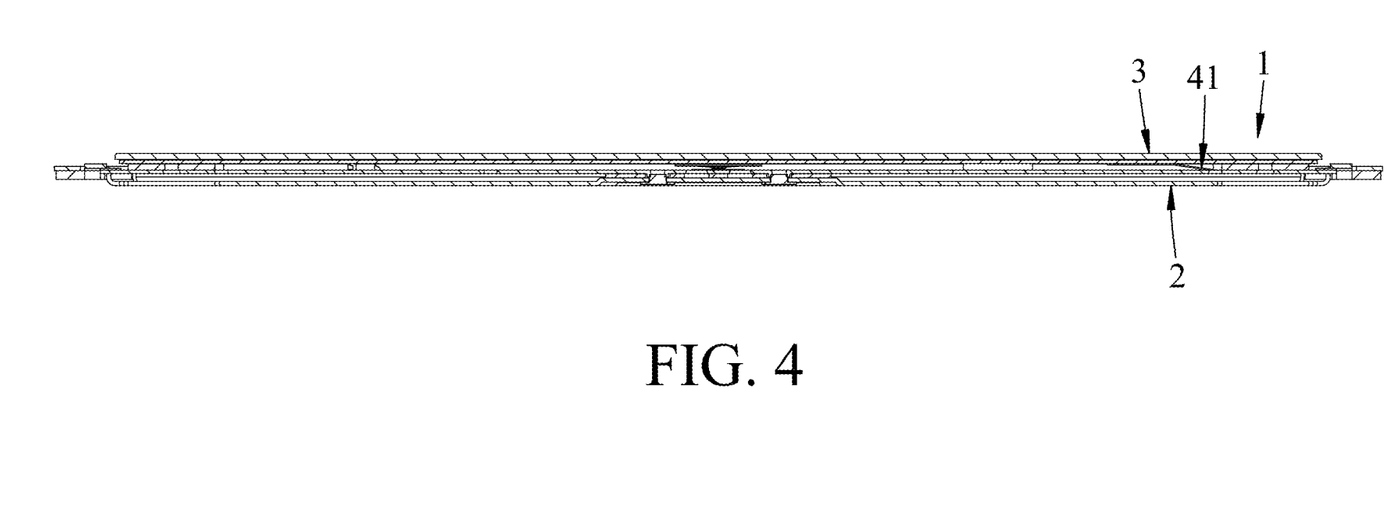
FIG. 4 is schematic sectional view taken along line IV-IV of FIG. 1.
Figure 5:
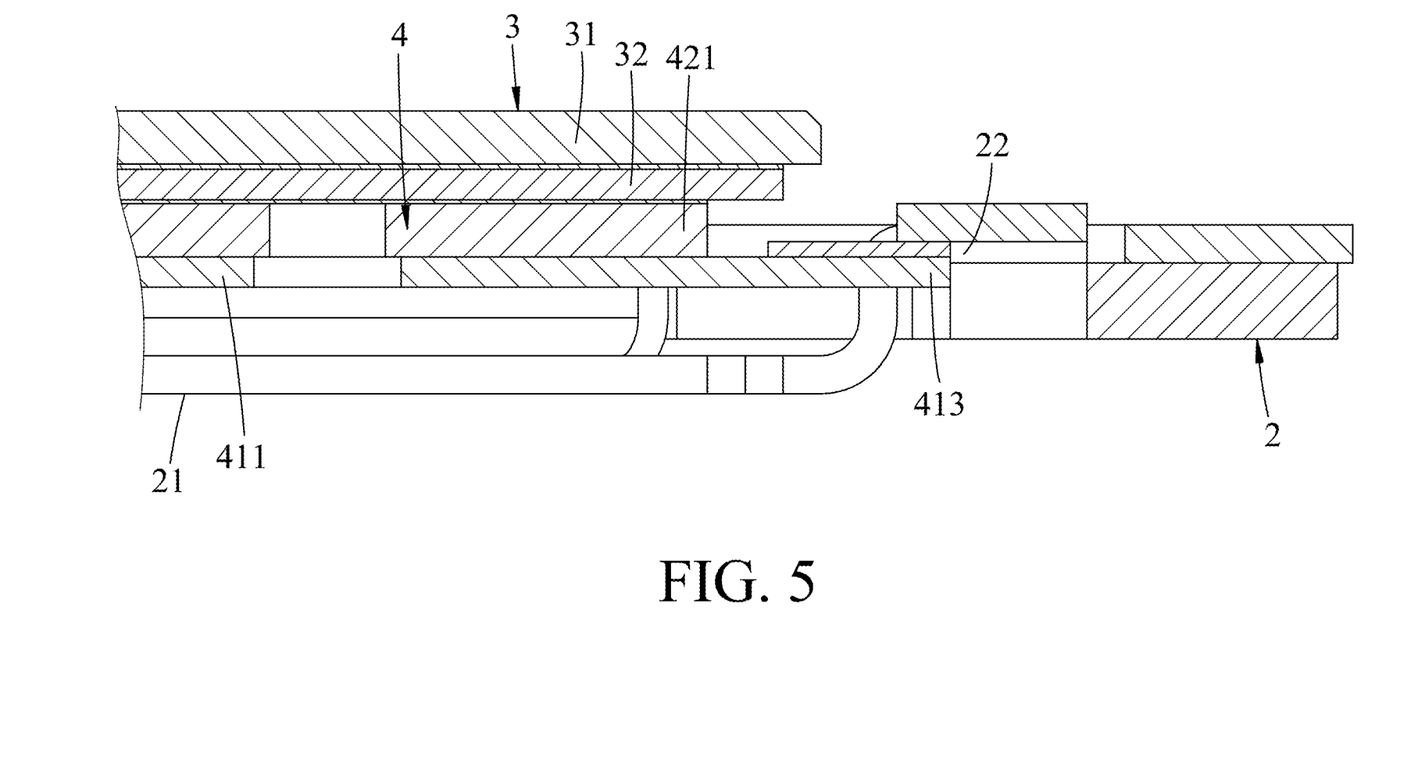
FIG. 5 is a fragmentary enlarged view of FIG. 4.

Referring to FIGS. 1, 4 and 5, when the touch pad device 1 has been assembled, the touch unit 3 is disposed on the resilient plate 41 and is supported by an upward resilient force of the resilient plate 41 to be spaced apart from the bottom plate 21 in an initial position, and the switch button 33 (see FIG. 2) has not been triggered, and does not generate a signal. When a periphery of the bottom plate 21 corresponding to the hook holes 22 is disposed on the hook portions 413, the hook portions 413 abut against the periphery of the bottom plate 21 by an upward resilient force of the resilient piece portions 411.

When a force is applied to press the touch pad 31 towards the bottom plate 21, the abutment portion 412 of the resilient plate 41 is not inclined relative to the bottom plate 21 due to being supported and abutted against by the supporting member 23. Hence, the switch button 33 is pushed by the abutment portion 412 to generate a signal (not shown) when being moved relative to the bottom plate 21 together with the circuit board 32.

When the force applied to the touch pad 31 is released, the touch unit 3 returns to the initial position by a resilient restoring force provided by the resilient piece portions 411.

Therefore, by virtue of the reinforcing frame 42 being in the shape of a closed frame and being connected to the hook portions 413 of the resilient plate 41, when the touch pad 31 is pressed, displacement of a periphery of the resilient plate 41 is limited by the reinforcing frame 42 in an direction perpendicular to the left-right direction (X) and the front-rear direction (Y) (i.e., an up-down direction) relative to the base unit 2. It can not only make displacement of the touch unit 3 stable in the up-down direction, but enhance the structural strength of the resilient plate 41.

Referring further to FIGS. 6 to 8 and 10, a second embodiment of the touch pad device 1' of the present disclosure includes the base unit 2', the touch unit 3', the resilient unit 4', and a plurality of fulcrum units 5' (in this embodiment, there are four fulcrum units 5'.). The base unit 2' and the touch unit 3' are substantially the same as those of the first embodiment. Differences between the first and second embodiments will be described below.

The resilient unit 4' has the resilient plate 41', and the reinforcing frame 42' including two reinforcing strips 420' that are connected between the resilient plate 41' and the circuit board 32' and that are connected to the hook portions 413' correspondingly connected to the resilient piece portions 411'.

For each of the resilient piece portions 411', the connecting section 415' and the extension sections 416' cooperatively define a first hollow section 417'. The first hollow sections 417' of the resilient piece portions 411' are spaced apart from each other in the left-right direction (X). The resilient piece portions 411', the abutment portion 412' and the reinforcing piece portions 414' of the resilient plate 41' cooperatively define two second hollow sections 418' spaced apart from each other in the front-rear direction (Y). The first and second hollow sections 417', 418' are configured for accommodating the fulcrum units 5'.

Each of the reinforcing strips 420' is made of a metal material, and has two connecting portions 421' that are respectively disposed on two adjacent ones of the hook portions 413' in extending directions of the extension sections 416' (i.e., the left-right direction (X) in this embodiment), and a strip portion 422' that is connected between the connecting portions 421' and that extends in the left-right direction (X). The connecting portions 421' are connected to the hook portions 413' by spot welding. The connecting portions 421', the strip portion 422' and the circuit board 32' are connected by adhesive attachment. The strip portions 422' of the reinforcing frames 42' are positioned outside the reinforcing piece portions 414' respectively.

Figure 9:
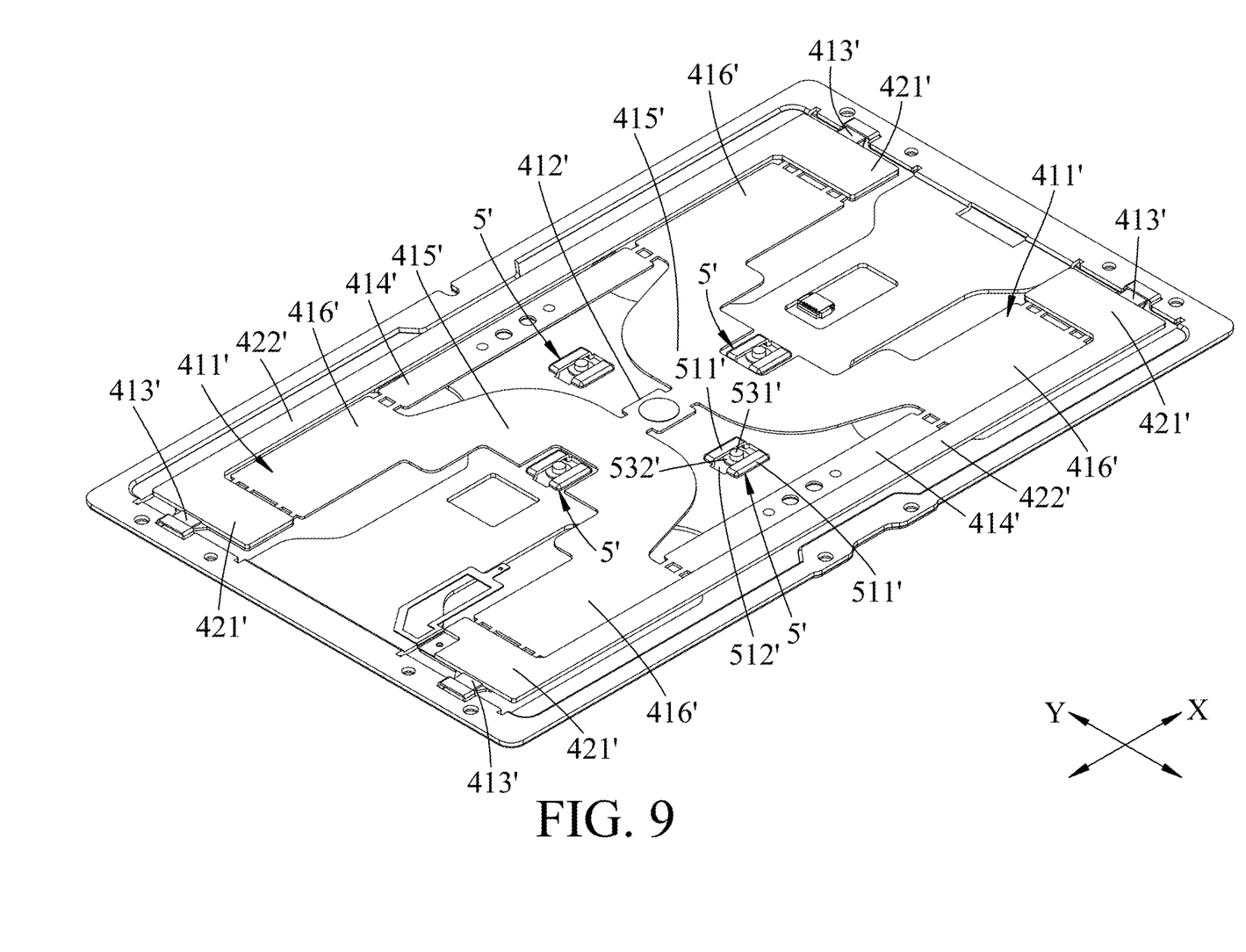
FIG. 9 is a fragmentary perspective view of the second embodiment without a touch unit.
Figure 10:
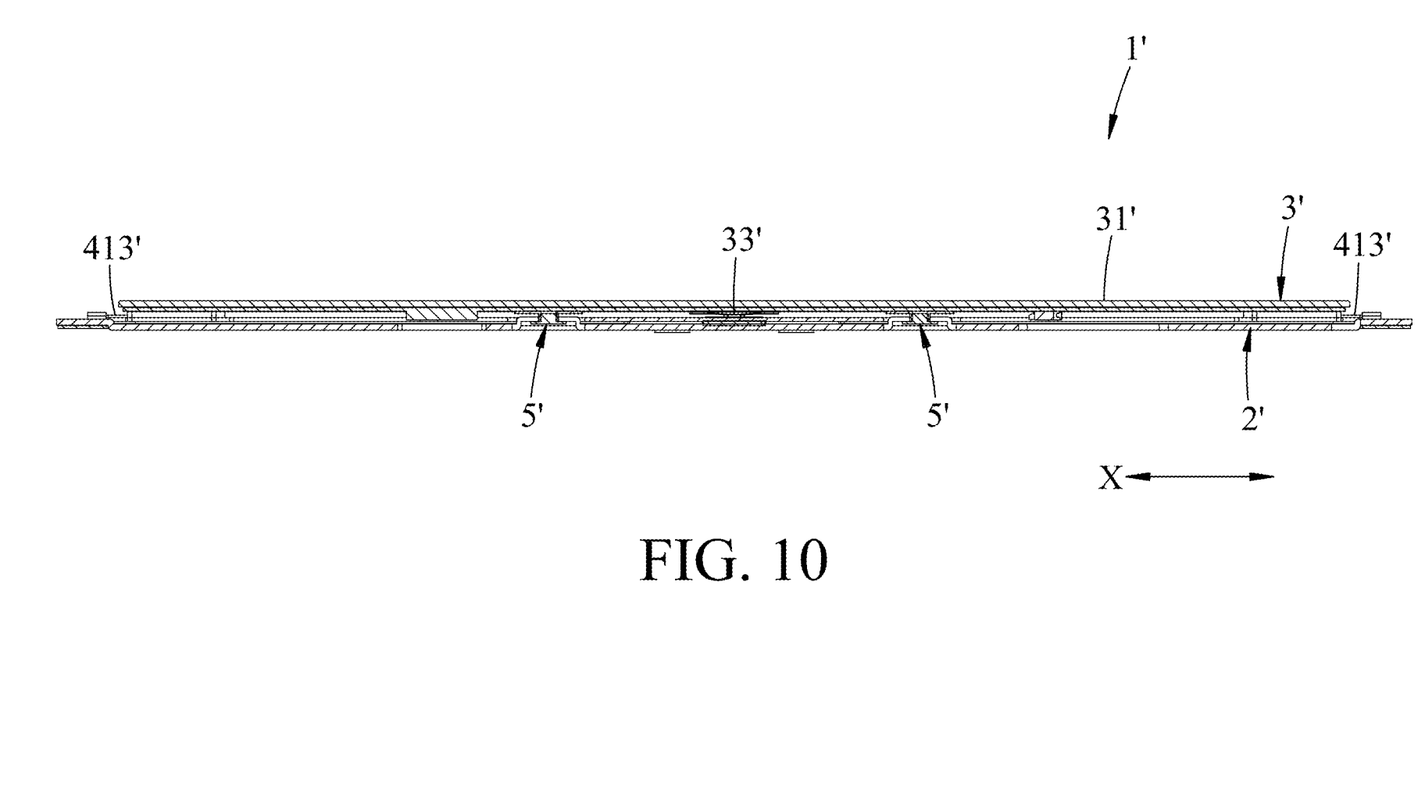
FIG. 10 is schematic sectional view taken along line X-X of FIG. 6.
Figure 11:
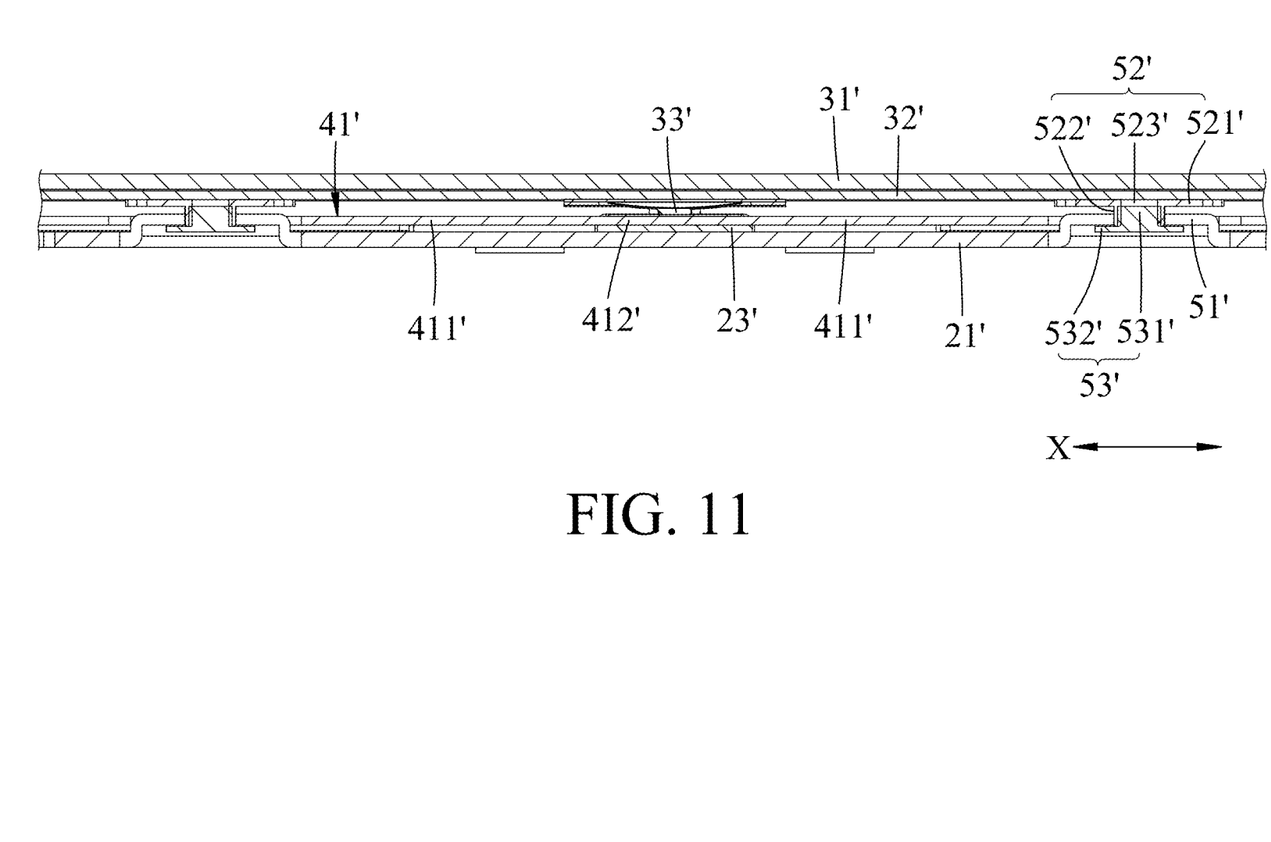
FIG. 11 is a fragmentary enlarged view of FIG. 10.

The fulcrum units 5' are disposed to surround and be adjacent to the supporting member 23', the abutment portion 412', and the switch button 33'. Two of the fulcrum units 5' are spaced apart from each other in the left-right direction (X) and are disposed in the first hollow sections 417', and the other two of the fulcrum units 5' are spaced apart from each other in the front-rear direction (Y) and are disposed in the second hollow sections 418'. Each of the fulcrum unit 5' includes a stop block 51' disposed on the bottom plate 21', a fixing member 52' disposed on the bottom of the circuit board 32' and corresponding in position to the stop block 51', and a fastening member 53' extending through the stop block 51' and connected to the fixing member 52'. The stop block 51' includes two protruding ribs 511' extending from the bottom plate 21' towards the fixing member 52' and spaced apart from each other. The protruding ribs 511' cooperatively define a slot 512' for extension of the fastening member 53' (see FIG. 9). The fixing member 52' includes a fixing plate portion 521' that is welded to be fixedly disposed on the bottom of the circuit board 32', a projecting portion 522' connected to the fixing plate portion 521' and extending through the slot 512' in a direction opposite to the touch pad 31', and a threaded hole 523' (see FIG. 11) formed in the projecting portion 522'. The fastening member 53' is a screw in this embodiment, and has a connecting part 531' extending through the slot 512' and connected to the fixing member 52', and a stopping part 532' connected to the connecting part 531' and movable in the up-down direction to stop on a bottom of the stop block 51' (in specific, to be configured to abut against bottoms of the protruding ribs 511' in a direction towards the fixing member 52' and to stop on the bottoms thereof). The threaded hole 523' is configured to allow the connecting part 531' to be threaded therethrough.

Figure 12:
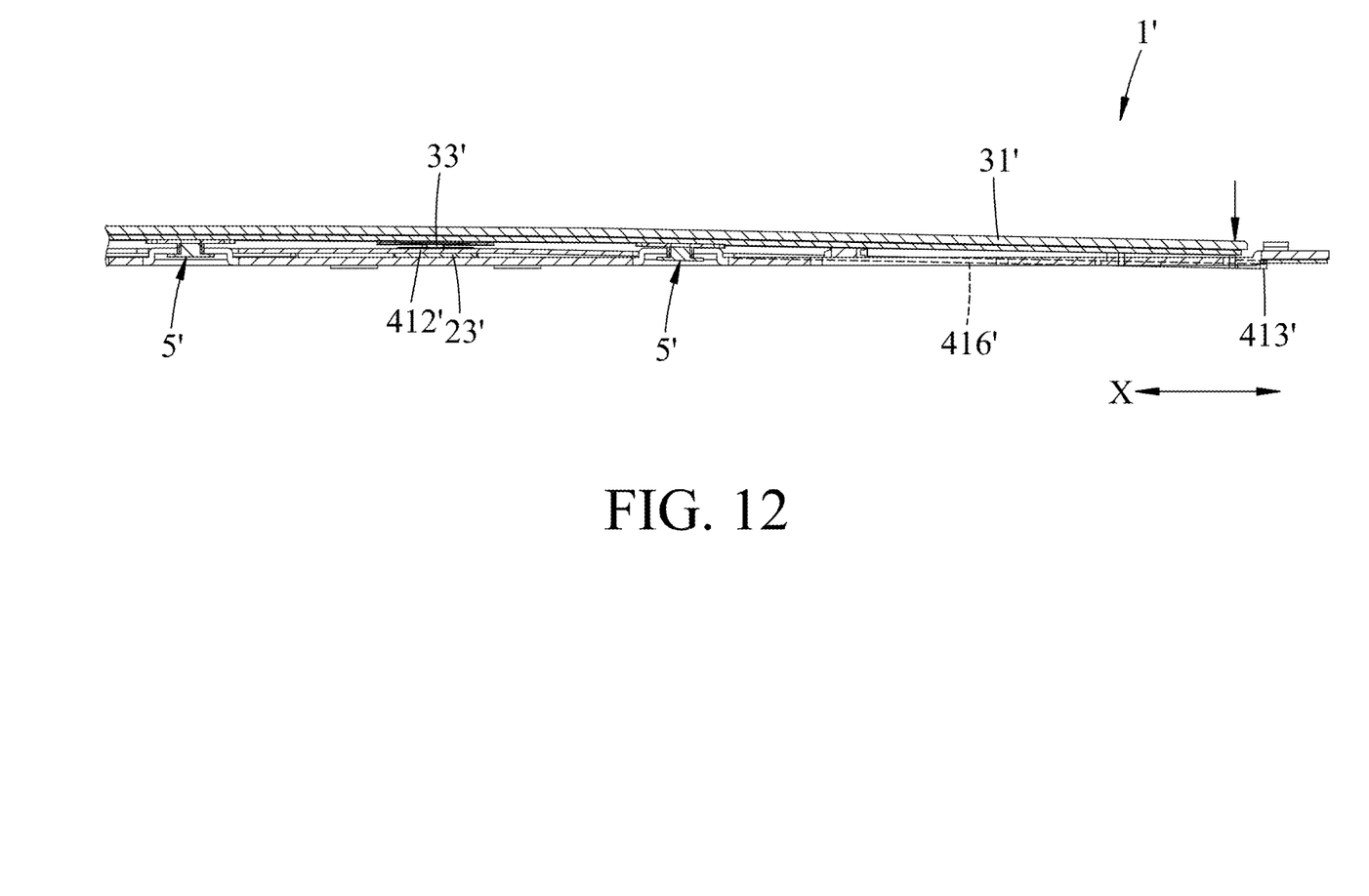
FIG. 12 is a fragmentary sectional view similar to FIG. 10, illustrating the touch unit being pressed.
Figure 13:
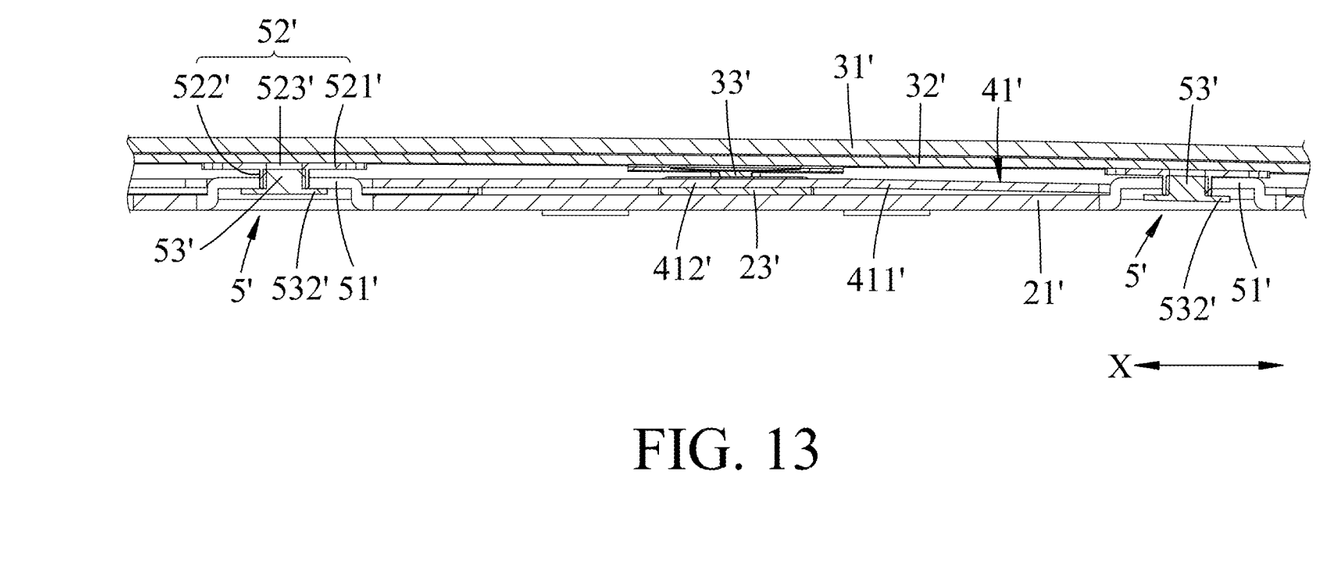
FIG. 13 is a fragmentary enlarged view of FIG. 12.
Figure 14:
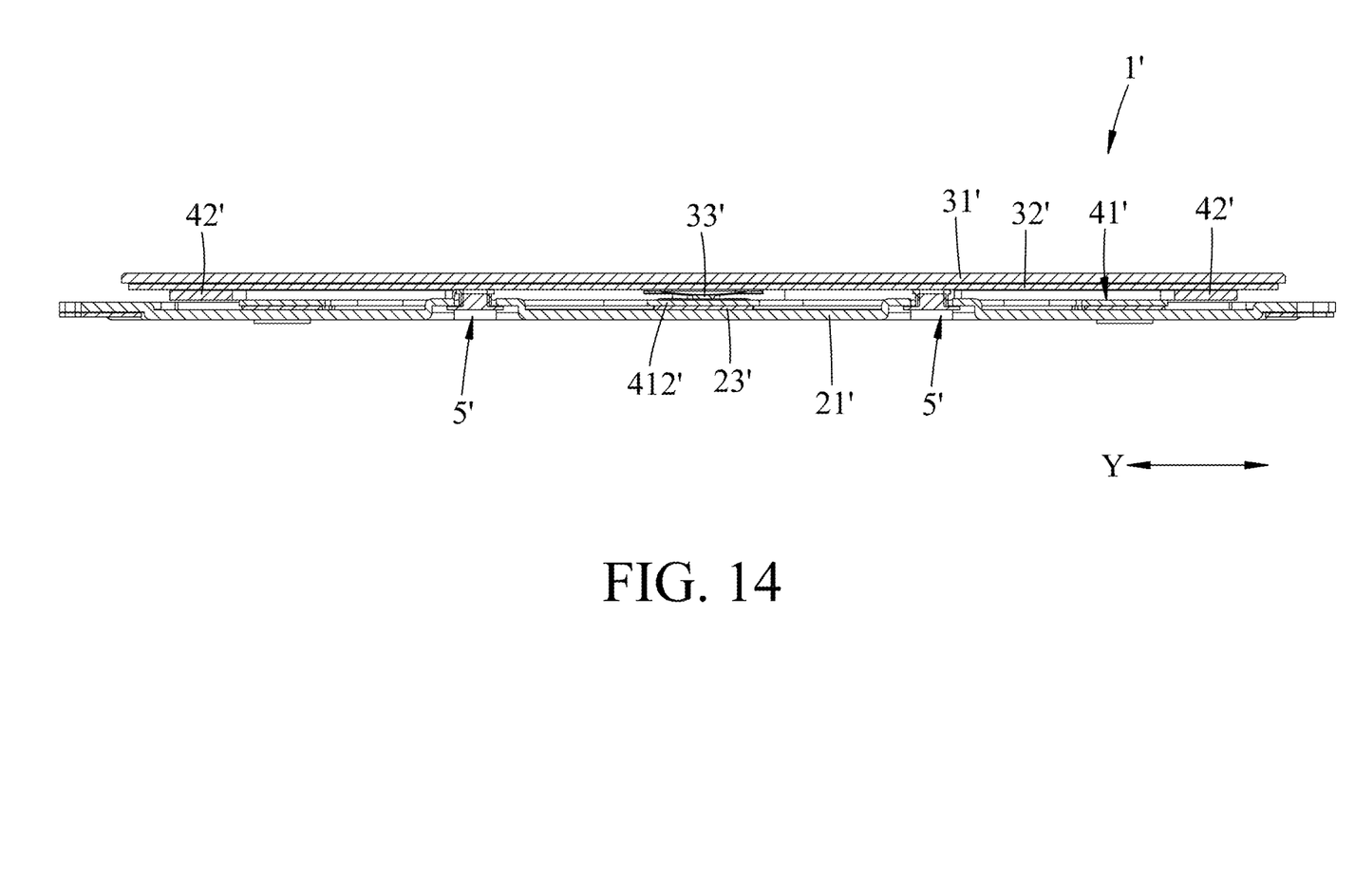
FIG. 14 is schematic sectional view taken along line XIV-XIV of FIG. 6.
Figure 15:
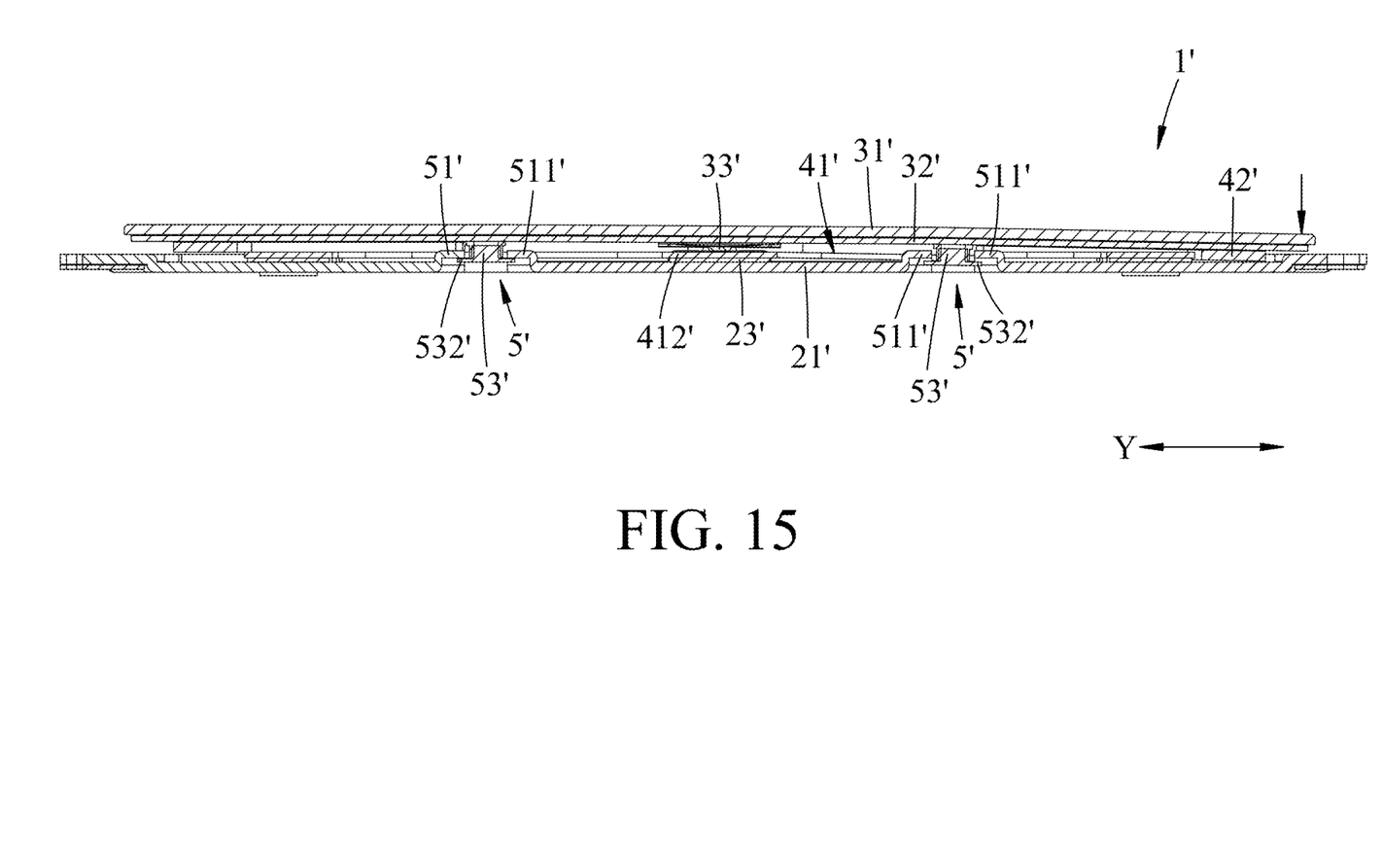
FIG. 15 is a sectional view similar to FIG. 14, illustrating the touch unit being pressed.

Referring to FIGS. 12, 13 and 15, when a force is applied to press the touch pad 31' towards the bottom plate 21', at least one of the fulcrum units 5' serves as the fulcrum, such that the stopping part 532' of the fastening member 53' of the at least one of the fulcrum units 5' is moved upward to stop on the bottoms of the protruding ribs 511' of the stop block 51'. The circuit board 32', the reinforcing frames 42' (see FIG. 14) and the resilient plate 41' are inclined relative to the bottom plate 21', and the stopping parts 532' of the fastening members 53' of the remaining fulcrum units 5' not serving as the fulcrum are moved downward to be away from the bottoms of the protruding ribs 511' of the stop blocks 51' of the corresponding fulcrum units 5'. At this time, the abutment portion 412' of the resilient plate 41' is not inclined relative to the bottom plate 21' due to being supported and abutted against by the supporting member 23'. Hence, the switch button 33' is pushed by the abutment portion 412' to generate a signal (not shown) when the circuit board 32' is inclined relative to the bottom plate 21'.

Figure 6:
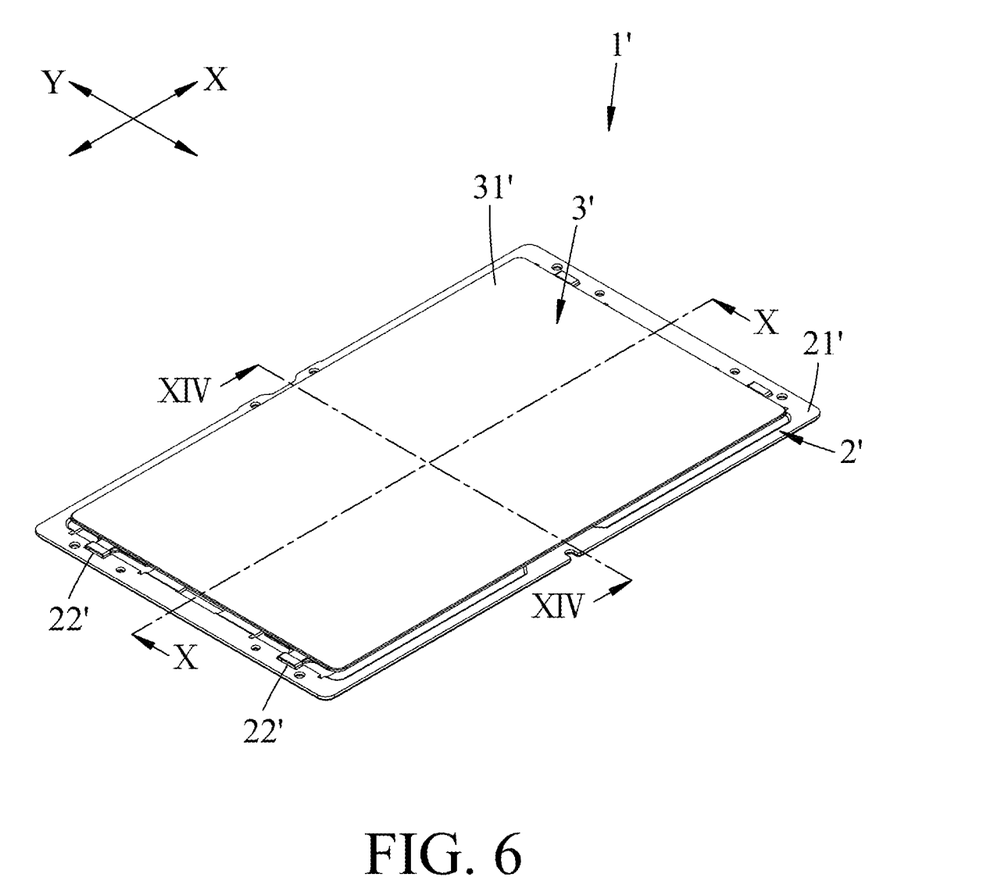
FIG. 6 is a perspective view of a second embodiment of a touch pad device according to the present disclosure.
Figure 7:
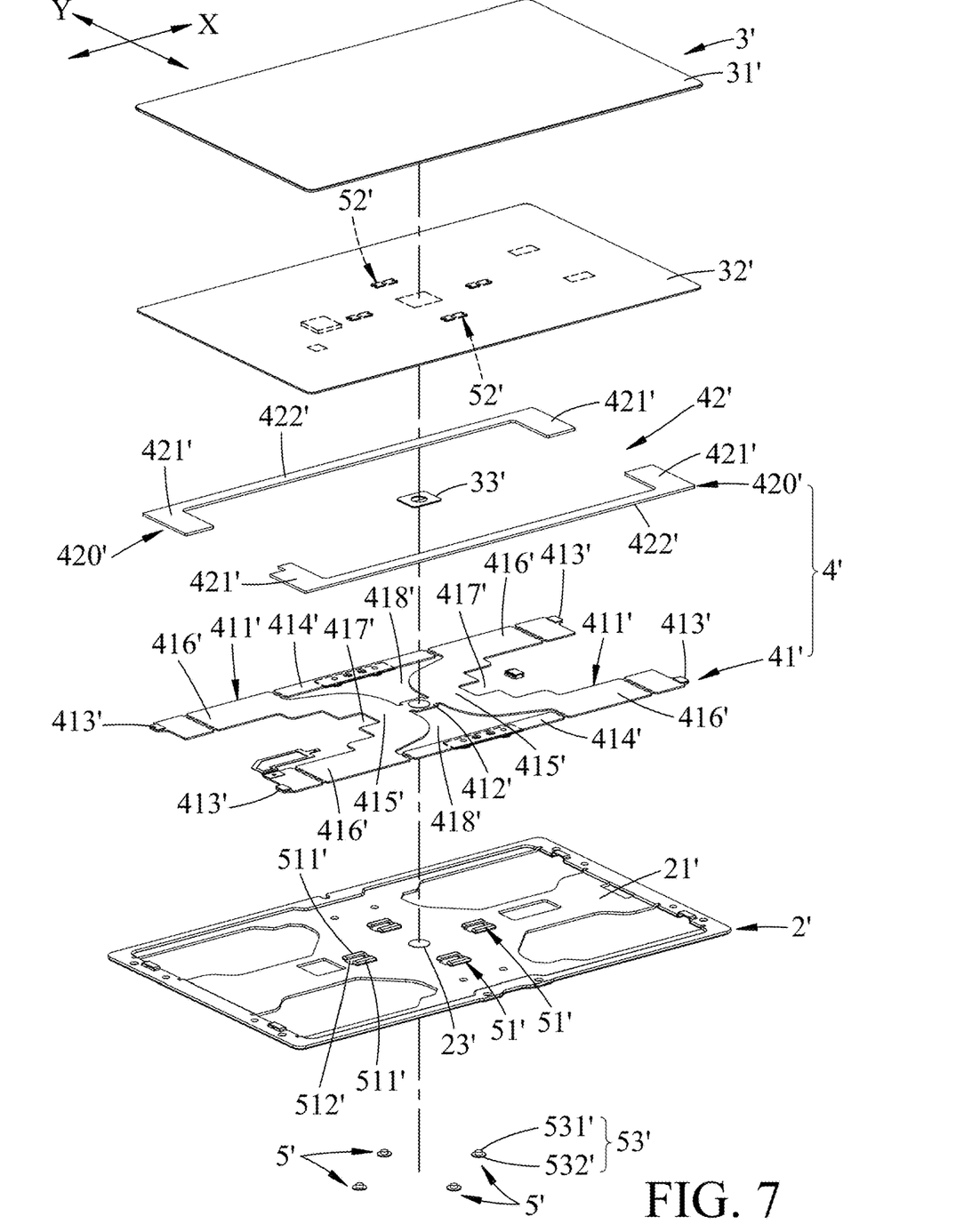
FIG. 7 is an exploded top perspective view of the second embodiment.
Figure 8:
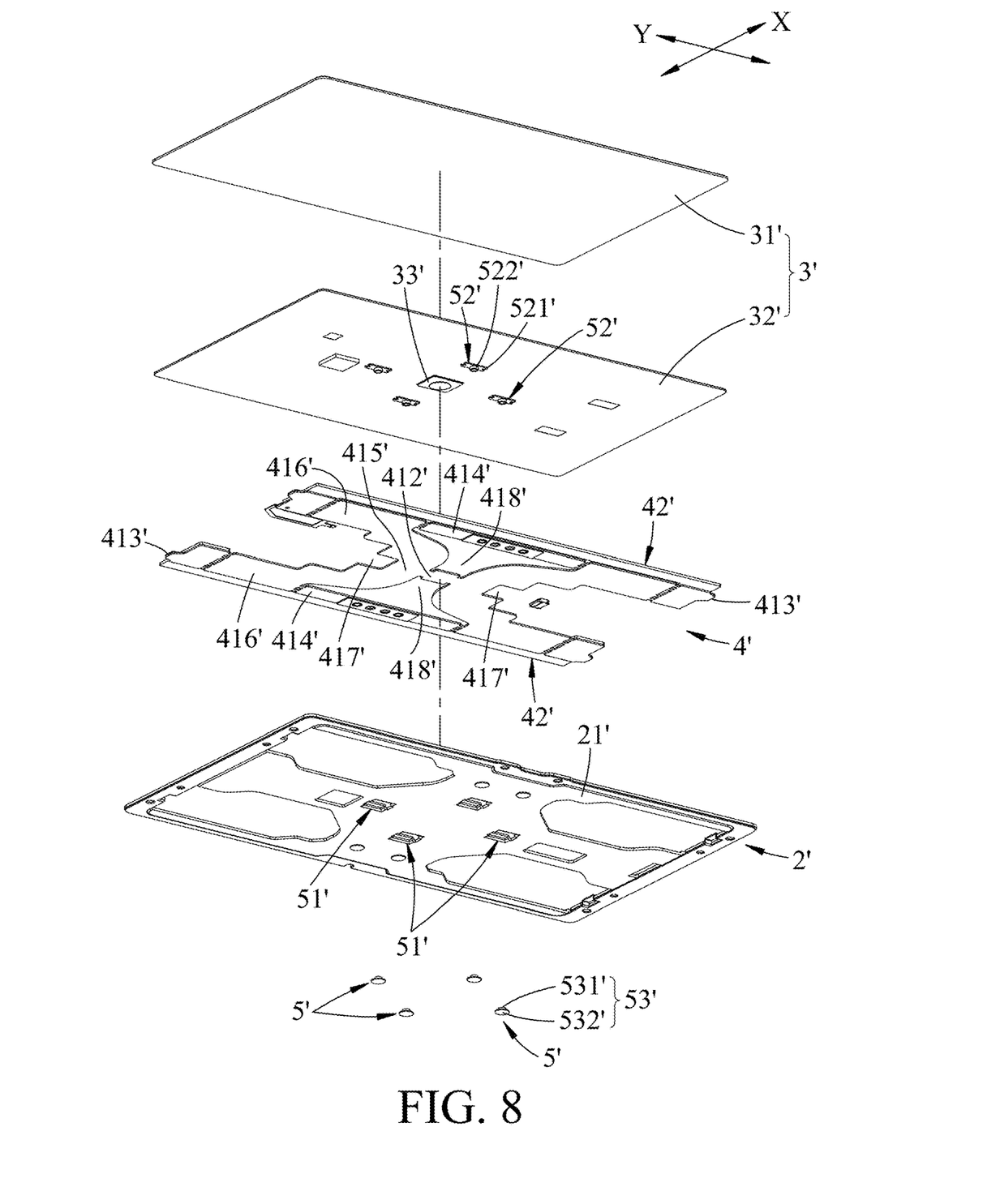
FIG. 8 is a partly exploded bottom perspective view of the second embodiment.

It should be noted that when the touch pad 31' is pressed, at least one of the fulcrum units 5' relatively distal from the pressing point serves as the fulcrum, and the fastening members 53' of the remaining fulcrum units 5' not serving as the fulcrum are moved downward. Referring to FIGS. 6, 12, and 13, when the right end of the touch pad 31' is pressed, the fulcrum unit 5' on the leftmost side serves as the fulcrum, and the fastening members 53' of the remaining fulcrum units 5' (only one is shown in FIGS. 12 and 13) move downward to be away from the corresponding stop blocks 51'. As shown in FIGS. 6 and 15, when the front end of the touch pad 31' is pressed, the rearmost fulcrum unit 5' serves as the fulcrum, and the fastening members 53' of the remaining fulcrum units 5' (only one is shown in FIG. 15) move downward to be away from the corresponding stop blocks 51'.

As such, when the touch pad 31' is pressed, the resistance arm between the resistance and the at least one fulcrum unit 5' serving as the fulcrum is shorter than that between the resistance and at least one of the hook portions 413' away from the effort and serving as the fulcrum (i.e., a touch pad device without the fulcrum units 5'), thereby displacement of triggering the switch button 33' being relatively shorter. It is noted that the resistance is the upward resilient force of the resilient plate 41 supporting the touch unit 3.

When the force applied to the touch pad 31' is released, the touch unit 3' returns to the initial position by the resilient restoring force provided by the resilient piece portions 411.

Therefore, in the second embodiment of the touch pad device 1' of the present disclosure, when the touch pad 31' is pressed, at least one of the fulcrum units 5' can serve as the fulcrum, so that the resistance arm between the resistance and the at least one of the fulcrum units 5' serving as the fulcrum is relatively shorter, the displacement of triggering the switch button 33' is shortened and the force applied to press the touch pad 31' is less, thereby the object of the disclosure being achieved.

In summary, the touch pad device 1, 1' of the present disclosure has a simple structure and is easy to be manufactured and assembled, so the object of the present disclosure can indeed be achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A touch pad device comprising:
   a base unit including a bottom plate, and a supporting member that is disposed on said bottom plate;

a touch unit including a touch pad, a circuit board that is connected to a bottom of said touch pad, and a switch button that is disposed on a bottom of said circuit board, said switch button corresponding in position to said supporting member; and an resilient unit disposed between said bottom plate and said circuit board, and including a resilient plate that is connected to said bottom plate, and a reinforcing frame that is connected between said resilient plate and said circuit board, said resilient plate having two resilient piece portions, and an abutment portion that is connected to said resilient piece portions and that is supported by and abuts against said supporting member, said abutment portion being positioned between said switch button and said supporting member, said reinforcing frame being connected to said resilient piece portions.

2. The touch pad device as claimed in claim 1, wherein said base unit further includes a plurality of hook holes formed on said bottom plate, said resilient plate further including a plurality of hook portions that are connected to said resilient piece portions and that are respectively hooked to said plurality of hook holes.

3. The touch pad device as claimed in claim 2, wherein:
said resilient plate further includes two reinforcing piece portions that are connected to said resilient piece portions;
each of said resilient piece portions has a connecting section that is connected to said abutment portion, and two extension sections that extend from said connecting section towards a direction away from said abutment portion, said extension sections of said resilient piece portions being respectively connected to said plurality of hook portions; and
said reinforcing frame is in a shape of a closed frame, and has two first frame segments, and two second frame segments that are connected between said first frame segments and that are spaced apart from each other, each of said first frame segments being correspondingly connected to two of said plurality of hook portions, said second frame segments being respectively positioned outside said reinforcing piece portions.

4. The touch pad device as claimed in claim 2, wherein:
said resilient plate further includes two reinforcing piece portions connected to said resilient piece portions;
each of said resilient piece portions has a connecting section connected to said abutment portion, and two extension sections extending from said connecting section towards a direction away from said abutment portion, said extension sections of said resilient piece portions being respectively connected to said plurality of hook portions; and said reinforcing frame of said resilient unit includes two reinforcing strips connected to said hook portions that are correspondingly connected to said resilient piece portions.

5. The touch pad device as claimed in claim 4, wherein each of said reinforcing strips of said resilient unit has two connecting portions that are respectively disposed on two adjacent ones of said plurality of hook portions in extending directions of said extension sections, and a strip portion that is connected between said connecting portions.

6. The touch pad device as claimed in claim 4, wherein:
said touch pad device further comprises a plurality of fulcrum units that are disposed to surround and be adjacent to said supporting member, said abutment portion, and said switch button, each of said plurality of fulcrum units including a stop block that is disposed on said bottom plate, a fixing member that is disposed on said bottom of said circuit board and that corresponds in position to said stop block, and a fastening member that extends through said stop block to be connected to said fixing member;
said stop block defines a slot for extension of said fastening member; and
said fastening member includes a connecting part that extends through said slot and that is connected to said fixing member, and a stopping part that is connected to said connecting part and that is movable to stop on a bottom of said stop block.

7. The touch pad device as claimed in claim 6, wherein for each of said resilient piece portions, said connecting section and said extension sections cooperatively define a first hollow section, said resilient piece portions, said abutment portion, and said reinforcing piece portions cooperatively defining two second hollow sections that are spaced apart from each other, said first hollow sections and said second hollow sections being configured for accommodating said plurality of fulcrum units.

8. The touch pad device as claimed in claim 6, wherein said stop block of each of said plurality of fulcrum units includes two protruding ribs that extend from said bottom plate and that are spaced apart from each other, said stopping part being configured to abut against bottoms of said protruding ribs in a direction towards said fixing member, said protruding ribs cooperatively defining said slot for extension of said connecting part.

9. The touch pad device as claimed in claim 6, wherein said fixing member of each of said plurality of fulcrum units includes a fixing plate portion that is disposed on said bottom of said circuit board, a projecting portion that is connected to said fixing plate portion and that extends through said slot in a direction opposite to said touch pad, and a threaded hole that is formed in said projecting portion, said threaded hole being configured to allow said connecting part to be threaded therethrough.

* * * * *